(12) United States Patent
Suzuki

(10) Patent No.: US 12,246,828 B2
(45) Date of Patent: Mar. 11, 2025

(54) AERIAL VEHICLE HAVING A FIRST WING AND A SECOND WING THAT TILT AND ROTATE TO FORM AN INVERTED V-SHAPE

(71) Applicant: AERONEXT INC., Tokyo (JP)

(72) Inventor: Yoichi Suzuki, Tokyo (JP)

(73) Assignee: AERONEXT INC., Tokyo (JP)

( * ) Notice: Subject to any disclaimer, the term of this patent is extended or adjusted under 35 U.S.C. 154(b) by 85 days.

(21) Appl. No.: 17/632,040

(22) PCT Filed: Aug. 2, 2019

(86) PCT No.: PCT/JP2019/030590
§ 371 (c)(1),
(2) Date: Feb. 1, 2022

(87) PCT Pub. No.: WO2021/024323
PCT Pub. Date: Feb. 11, 2021

(65) Prior Publication Data
US 2022/0274701 A1 Sep. 1, 2022

(51) Int. Cl.
*B64C 29/02* (2006.01)
*B64C 3/40* (2006.01)
(Continued)

(52) U.S. Cl.
CPC ............... *B64C 29/02* (2013.01); *B64C 3/40* (2013.01); *B64C 39/08* (2013.01); *B64U 10/20* (2023.01);
(Continued)

(58) Field of Classification Search
CPC .. B64C 29/02; B64C 3/40; B64C 3/56; B64C 25/32; B64U 10/20; B64U 30/12; B64U 50/13; B64U 60/70
See application file for complete search history.

(56) References Cited

U.S. PATENT DOCUMENTS 6,398,157 B1   6/2002  Ingram
11,639,220 B1*  5/2023 Erdozain, Jr. ......... B64C 39/024
                                                    244/7 B
(Continued)

FOREIGN PATENT DOCUMENTS

CN      1118591 A      3/1996
CN      1898128 A      1/2007
(Continued)

OTHER PUBLICATIONS

Notification of reasons of refusal mailed Apr. 13, 2023 for Japanese Patent Application 2019-547529.
(Continued)

*Primary Examiner* — Brady W Frazier
*Assistant Examiner* — Shanna Danielle Glover

(57) ABSTRACT

An aerial vehicle having more basic structure and safety measures. The aerial vehicle according to the present invention includes a thrust unit having a plurality of rotary vanes for generating thrust, a tail, a fuselage that connects the thrust unit and the tail, a main wing provided in a substantially center of the fuselage, and a control unit for controlling at least the main wing. When the aerial vehicle makes a landing, the control unit controls the main wing so that a part of the main wing becomes a lower end.

3 Claims, 10 Drawing Sheets

(51) Int. Cl.
  *B64C 39/08* (2006.01)
  *B64U 10/20* (2023.01)
  *B64U 30/12* (2023.01)
  *B64U 50/13* (2023.01)
  *B64U 60/70* (2023.01)
  *B64U 10/25* (2023.01)

(52) U.S. Cl.
  CPC ............. *B64U 30/12* (2023.01); *B64U 50/13* (2023.01); *B64U 60/70* (2023.01); *B64U 10/25* (2023.01)

(56) References Cited

U.S. PATENT DOCUMENTS

| | | | |
|---|---|---|---|
| 2002/0074452 A1* | 6/2002 | Ingram | B64C 3/40 244/7 B |
| 2010/0120321 A1* | 5/2010 | Rehkemper | A63H 27/12 446/36 |
| 2013/0206921 A1 | 8/2013 | Paduano | |
| 2015/0336663 A1* | 11/2015 | Paduano | B64U 30/297 244/12.4 |
| 2016/0378120 A1 | 12/2016 | Creasman | |

FOREIGN PATENT DOCUMENTS

| | | | |
|---|---|---|---|
| CN | 105730676 A | * | 7/2016 |
| CN | 105730677 A | | 7/2016 |
| CN | 106114853 A | | 11/2016 |
| JP | 2017015697 A | | 1/2017 |
| JP | 2017159751 A | | 9/2017 |
| KR | 20170042952 A | | 4/2017 |
| WO | 2018194214 A1 | | 10/2018 |
| WO | 2018236295 A1 | | 12/2018 |
| WO | 2019135264 A1 | | 7/2019 |

OTHER PUBLICATIONS

Notification of Reasons for Refusal dated Jan. 12, 2023 for JP Patent Application No. 2019-547529.
International Search Report dated Aug. 27, 2019 for International Patent Application No. PCT/JP2019/030590.
First Notice of Examination Action dated Sep. 28, 2023 for CN Patent Application No. 201980098909.6.
Notice of reasons for refusal dated Oct. 12, 2023 for JP Patent application No. 2019-547529.
Second Examination Opinion Notice dated Apr. 10, 2024 for Chinese Patent Application No. 201980098909.6.

* cited by examiner

AERIAL VEHICLE HAVING A FIRST WING AND A SECOND WING THAT TILT AND ROTATE TO FORM AN INVERTED V-SHAPE

TECHNICAL FIELD

The present invention relates to an aerial vehicle and a flight method for the aerial vehicle.

BACKGROUND ART

In recent years, various services have been provided using a rotary-flying aircraft such as a drone or an unmanned aerial vehicle (UAV) (hereinafter simply referred to as "aerial vehicle") used for various purposes (for example, refer to Patent Literature 1).

Also, among such aerial vehicles, there is an aerial vehicle disclosed in Patent Literature 2 having a loading part loaded with a baggage.

PRIOR ARTS

Patent Literature

[Patent Literature 1] Japanese Unexamined Patent Publication No. 2017-15697
[Patent Literature 2] Japanese Unexamined Patent Publication No. 2017-159751

SUMMARY OF THE INVENTION

Technical Problem

When transporting the above-mentioned baggage, the technique described in Patent Literature 2 is complicated in the structure and does not take measures to cope with a lateral wind when descending, which causes a problem in safety.

Thus, it is an object of the present invention to provide an aerial vehicle having more basic structure and safety measures Technical Solution According to the present invention, there is provided an aerial vehicle comprising: a thrust unit having a plurality of rotary vanes for generating thrust, a tail, a fuselage that connects the thrust unit and the tail, a main wing provided in the substantially center of the fuselage, and a control unit for controlling at least the main wing, wherein when the aerial vehicle makes a landing, the control unit controls the main wing so that a part of the main wing becomes a lower end.

Advantageous Effects

According to the present invention, an aerial vehicle having more basic structure and safety measures can be provided.

DETAILED DESCRIPTION OF THE EMBODIMENTS

The contents of the embodiment of the present invention will be listed and described. An aerial vehicle and a flight method for the aerial vehicle according to an embodiment of the present invention has the following configuration.

[Item 1]

An aerial vehicle comprising:
  a thrust unit having a plurality of rotary vanes for generating thrust;
  a tail;
  a fuselage that connects the thrust unit and the tail;
  a main wing provided in a substantially center of the fuselage; and
  a control unit for controlling at least the main wing,
  wherein when the aerial vehicle makes a landing, the control unit controls the main wing so that a part of the main wing becomes a lower end.

[Item 2]

The aerial vehicle as set forth in Item 1,
  wherein the main wing is comprising of a pair of two fixed wings, and
  when the aerial vehicle makes a landing, the two fixed wings are in a symmetrical state forming a substantially inverted V shape on both sides of the fuselage, and are inclined downward almost linearly as they go backward.

[Item 3]

A flight method for the aerial vehicle as set forth in Item 1 or 2, comprising:
  standing the fuselage in a vertical direction so that the thrust unit becomes an upper end in an initial state;
  driving the thrust unit and ascending the rotor blade so that it becomes a front end in the traveling direction;
  displacing the main wing at a predetermined height by approximately 90 degrees in a horizontal direction, and allowing the fuselage to fly so that it extends in the horizontal direction;
  displacing the main wing backward in the traveling direction while maintaining the posture of the aerial vehicle so that the tail becomes a lower end over its destination; and descending so that a part of the main wing becomes a lower end.

DETAILS OF EMBODIMENTS

Hereinafter, an aerial vehicle and a flight method for the aerial vehicle according to embodiments of the present invention will be described with reference to the accompanying drawings.

DETAILS OF EMBODIMENTS ACCORDING TO THE PRESENT INVENTION

Figure 1:
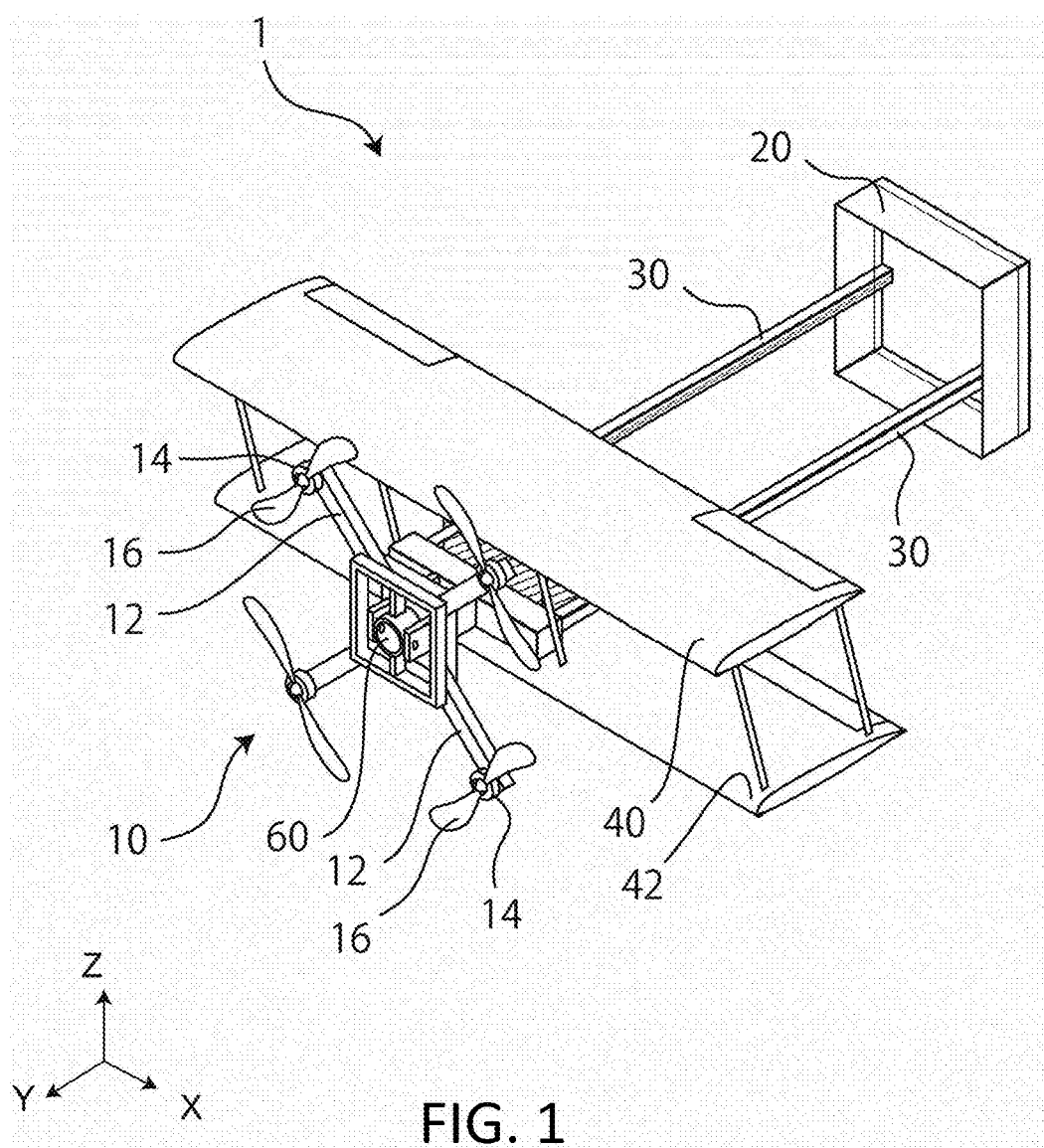
FIG. 1 is a perspective view of an aerial vehicle according to the present invention.

As shown in FIG. 1, an aerial vehicle 1 according to an embodiment of the present invention includes a thrust unit 10 having a plurality of propellors 16 for generating thrust, a tail 20, a fuselage 30 that connects the thrust unit 10 and the tail 20, and a main wing (upper fixed wing 40, lower fixed wing 42) provided in a substantially center of the fuselage 30.

It should also be noted that the aerial vehicle 1 illustrated in the figure is depicted in a simplified manner in order to facilitate the description of the structure of the present invention. For example, the detailed configuration of a control unit and the like is not illustrated.

Further, the axis in the figure represents an absolute axis. The Z axis (Z direction) is a vertical direction, and both the X axis and the Y axis are horizontal directions.

<Details of Structure>

The thrust unit 10 according to the present embodiment includes a propeller 16, a motor 14 that rotates the propeller 16, and a motor arm 12 that supports the motor 14. The thrust unit 10 according to the present embodiment has four sets of the propeller 16, the motor 14, and the motor arm 12 in a cross shape.

The propeller 16 rotates by receiving output from the motor 14. As the propeller 16 rotates, a propulsive force is generated for taking off the aerial vehicle 1 from a departure point, horizontally moving it, and landing it at a destination (details of the flight will be described later). Further, the propeller can rotate rightward, stop, and rotate leftward.

The propeller 16 may have any number of vanes (rotors) (e.g., 1, 2, 3, 4, or more vanes). The shape of the vane can be any shape such as a flat shape, a bent shape, a twisted shape, a tapered shape, or a combination thereof.

In addition, the shape of the vane can be transformed (for example, extendable, foldable, bendable, etc.). The vanes can be symmetrical (having the same upper and lower surfaces) or asymmetric (having differently shaped upper and lower surfaces).

The vanes can be formed to have a geometrical form that is preferable for generating dynamic aerodynamic forces (e.g., lift, thrust) when an airfoil, wing or vane is moved through the air. The geometrical form of the vane can be appropriately selected to optimize the dynamic air characteristics of the vane, such as increasing lift and thrust and reducing a resistance force.

The motor 14 generates the rotation of the propeller 16. For example, a drive unit may include an electric motor, an engine, or the like. The vanes can be driven by the motor and rotate clockwise and/or counterclockwise around a rotation axis of the motor (e.g., the long axis of the motor).

The vanes can all rotate in the same direction, or can also rotate independently. Some of the vanes rotate in one direction and the other vanes rotate in the other direction. All of the vanes can be rotated at the same rotational speed, and can also be rotated at different rotational speeds. The number of rotations can be determined automatically or manually based on the dimensions (for example, size, weight) or the control state (speed, moving direction, etc.) of the moving body.

The motor arm 12 is a member that supports the corresponding motor 14 and propeller 16. The motor arm 12 may include a color-displaying body such as an LED to indicate the flight state, flight direction, etc. of the rotary-flying aircraft. The motor arm 12 according to the present embodiment can be formed of a material appropriately selected from carbon, stainless steel, aluminum, magnesium, etc., or alloys or combinations thereof.

In the present embodiment, the thrust unit 10 (see FIG. 1) and the fuselage 30 are connected via a gimbal 60. Thereby, the thrust unit 10 and the fuselage 30 can be displaced independently.

That is, since the direction of the thrust unit 10 can be controlled independently of the direction of the fuselage 30, the gimbal 60 that is not affected by the direction of the fuselage 30 and the direction of the thrust unit 10 is a gimbal 60 that is displaceable in at least two axial directions (X axis and Z axis).

The fuselage 30 has two linear shapes, each having one end connected to the thrust unit 10 and the other end connected to the tail 20.

The main wings (the upper fixed wing 40 and the lower fixed wing 42) are connected, respectively, to the fuselage 30. The aerial vehicle according to the present embodiment is a concept in which a biplane is connected to a rotary-flying aircraft via a gimbal, but it may not be a biplane.

Next, the flying method for the aerial vehicle according to the present embodiment will be described with reference to FIGS. 2 to 7.

Figure 2:
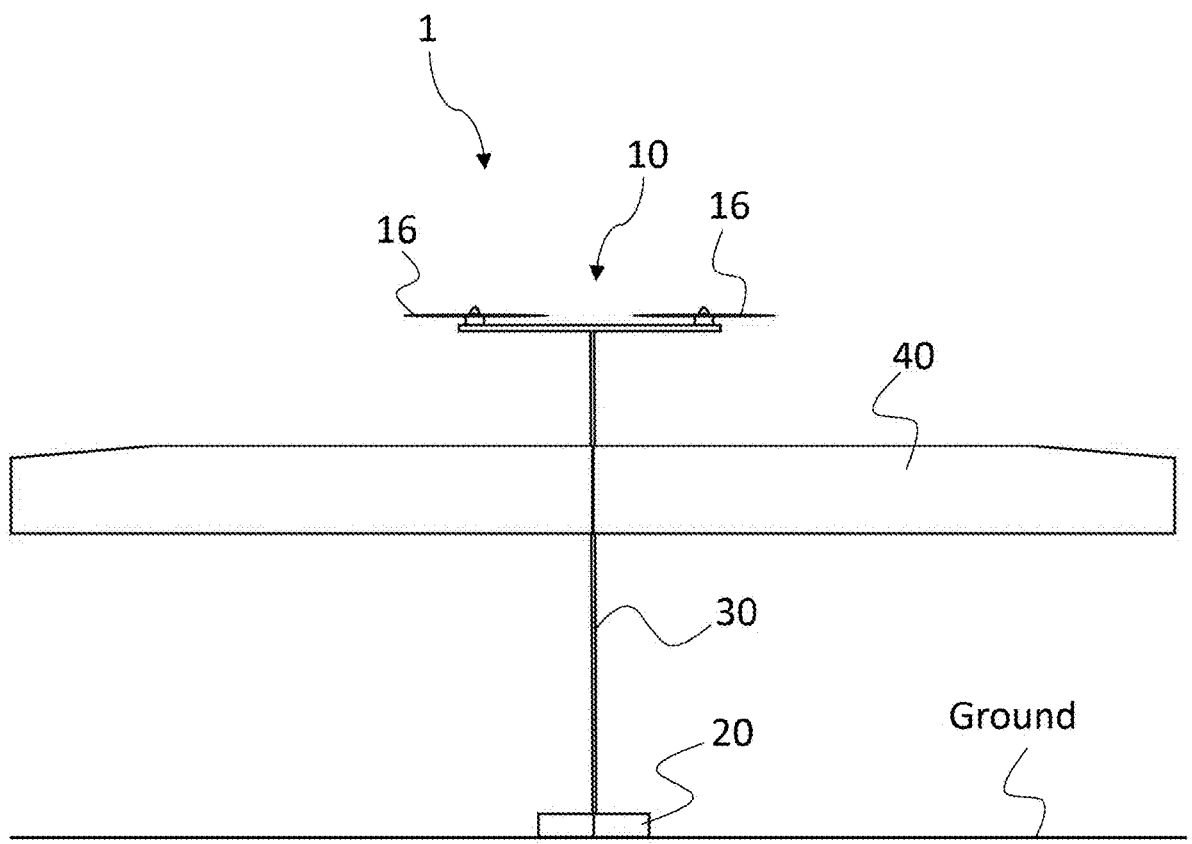
FIG. 2 is a schematic diagram illustrating the initial state of the aerial vehicle of FIG. 1.

FIG. 2 is illustrating an initial state of the aerial vehicle. In the initial state, the aerial vehicle 1 is standing with the tail 20 in contact with the ground. In other words, in the initial state, the aerial vehicle 1 is set so that the fuselage 30 is standing in the vertical direction.

In the initial state, an auxiliary arm, an auxiliary leg, or the like can be used to prevent the aerial vehicle from falling.

Figure 3:
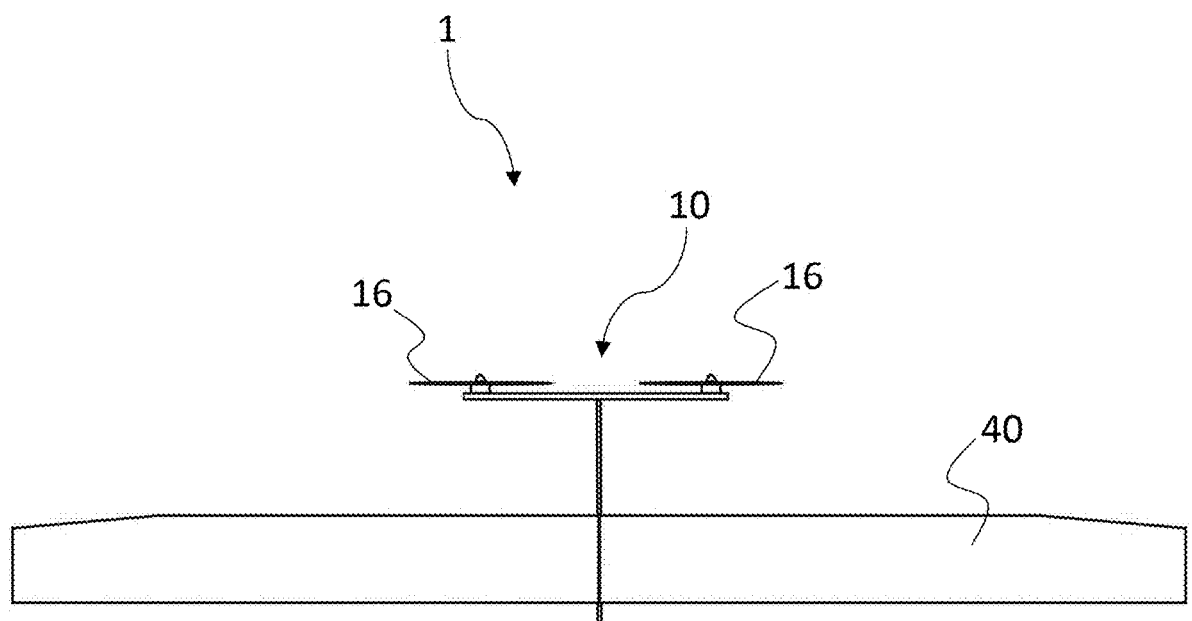
FIG. 3 is a schematic diagram illustrating a state at the time of ascent of the aerial vehicle of FIG. 1.

The aerial vehicle 1 obtains an upward thrust by rotating the propeller 16 of the thrust unit 10 from the state shown in FIG. 2, and floats and ascends (ascending posture) as shown in FIG. 3.

Figure 4:
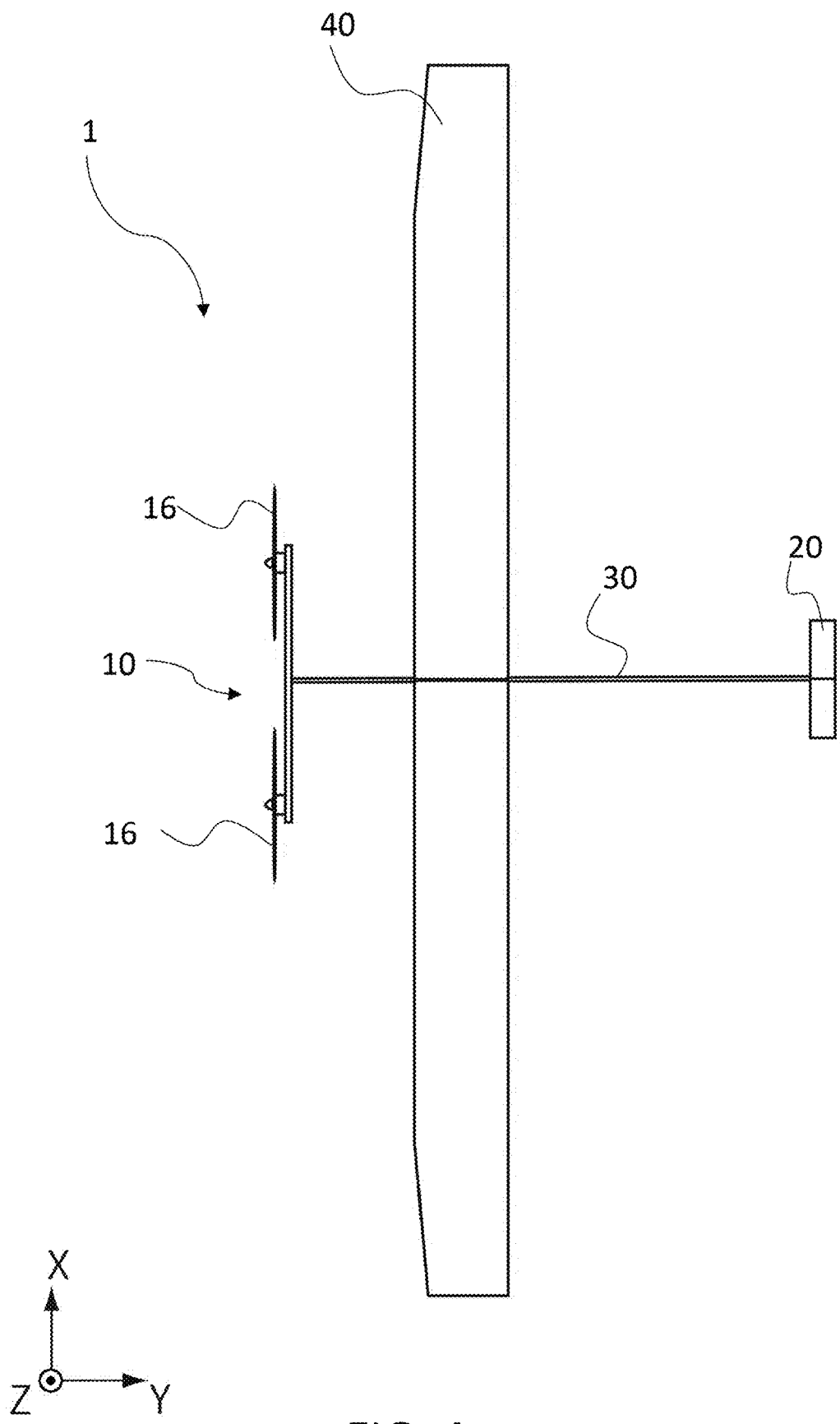
FIG. 4 is a schematic diagram illustrating a state at the time of flight of the aerial vehicle of FIG. 1.

When the aerial vehicle 1 ascends to a predetermined height, the thrust unit 10 is displaced toward the horizontal direction by approximately 90 degrees to change the direction of the vehicle body (horizontal posture), as shown in FIG. 4.

In this state, it becomes possible to propel in the horizontal direction by a principle similar to a propeller airplane. According to such a configuration, it becomes possible to travel to the sky above the destination at a high speed. In horizontal level flight, the aerial vehicle 1 could take all forms existing in the actual aircraft, from the forward wing to the gentle swept-back wing, and positively acquires the lift due to velocity.

Figure 5:
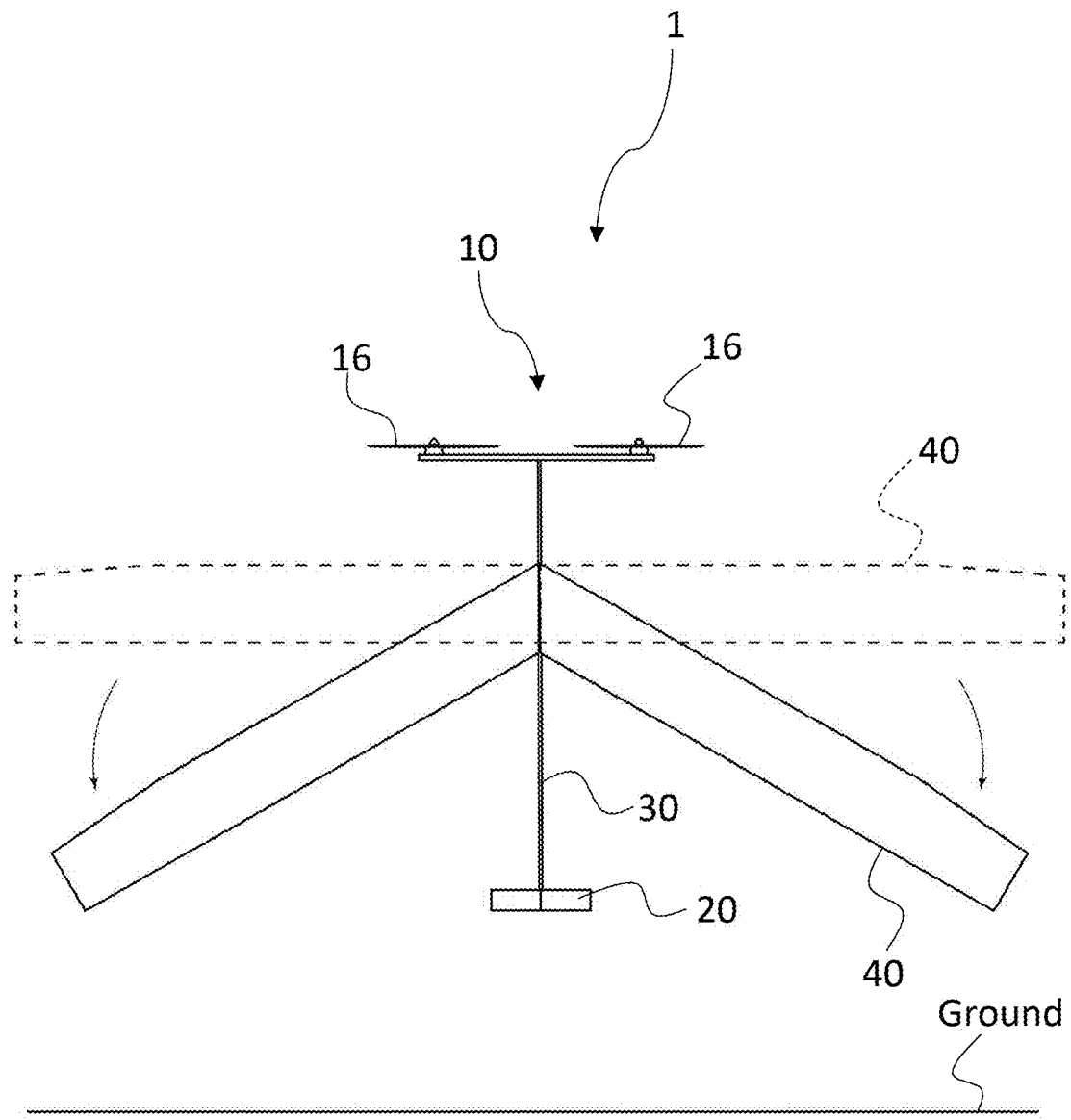
FIG. 5 is a schematic diagram illustrating a state at the time of descent of the aerial vehicle of FIG. 1.
Figure 6:
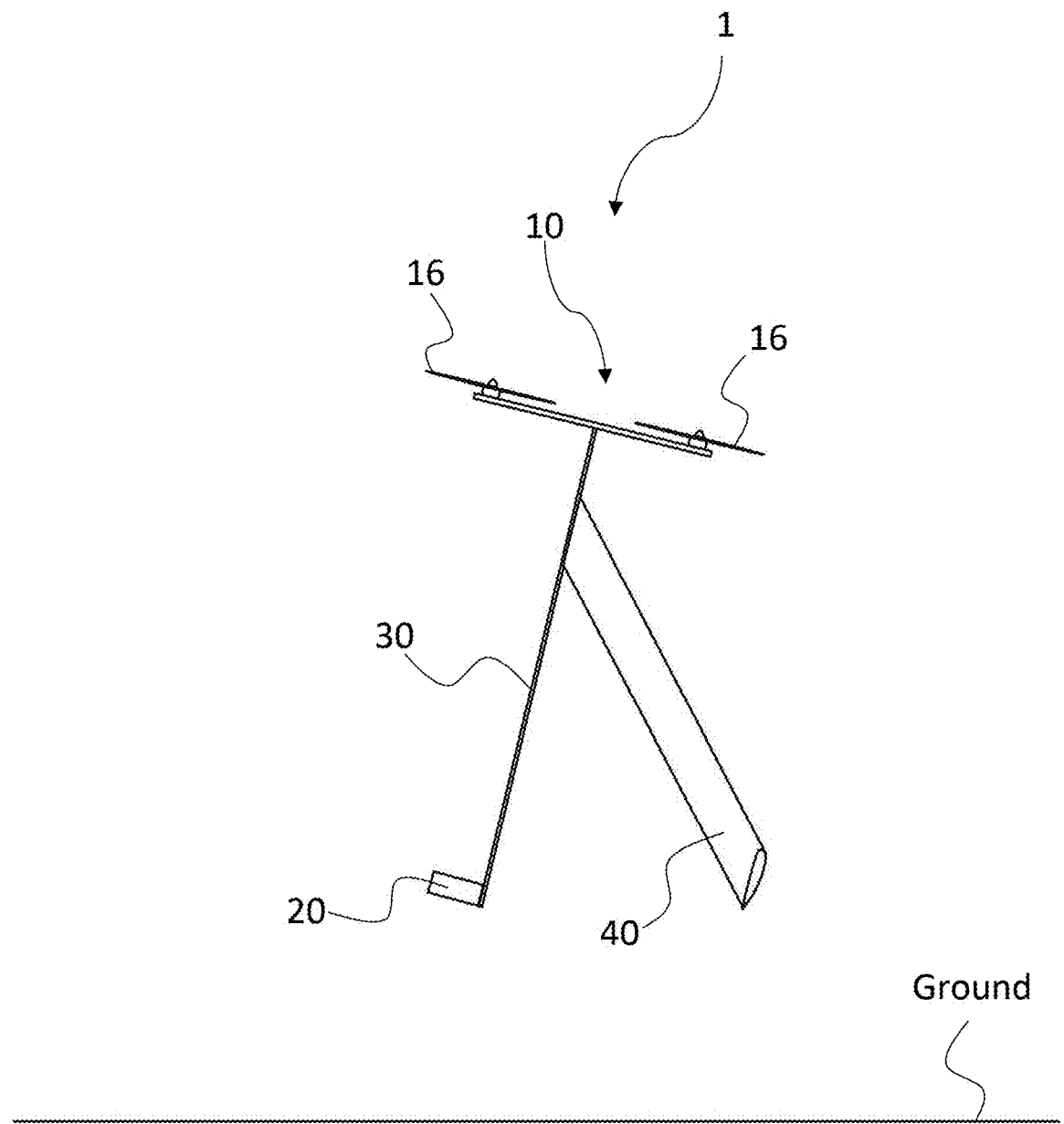
FIG. 6 is another schematic diagram illustrating a state at the time of descent of the aerial vehicle of FIG. 1.
Figure 6:
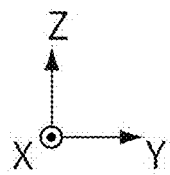
Figure 7:
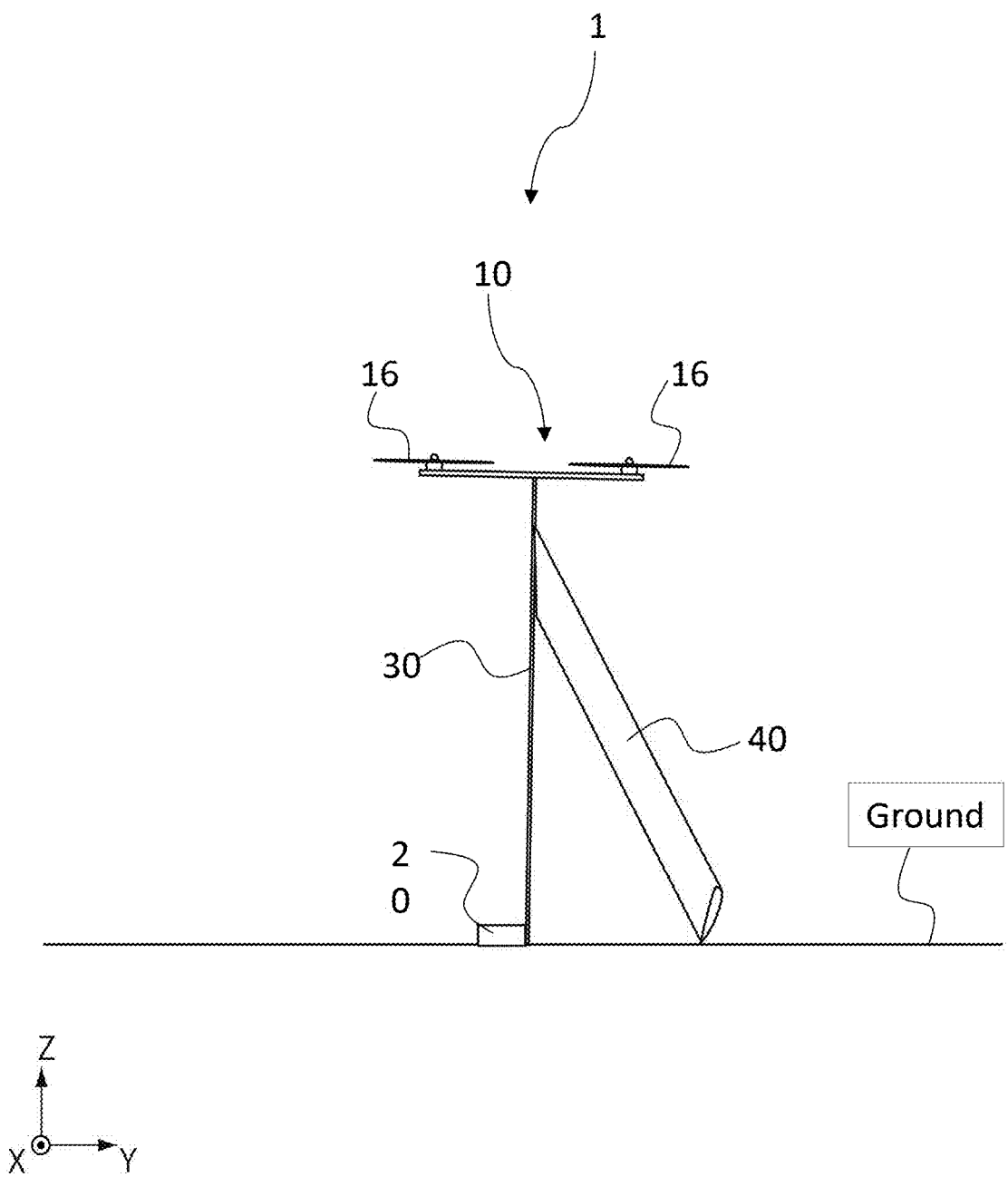
FIG. 7 is a schematic diagram illustrating a state at the time of landing of the aerial vehicle of FIG. 1.

When the aerial vehicle arrives over the destination, the aerial vehicle transitions to a hovering state by lowering the rotational speed of the propeller 16 while making the vehicle vertical (downward posture). That is, the orientation of the aerial vehicle is returned from the horizontal direction to the vertical direction. At this time, as shown in FIGS. 5 and 6, the control unit controls the main wing so that a part of the main wing becomes a lower end. In this state, as shown in FIG. 5, the two fixed wings are in a symmetrical state forming a substantially inverted V shape on both sides of the fuselage 30 and are inclined downward in a substantially straight line toward the rear. Then, as shown in FIG. 7, a part of the main wing becomes a swept-back wing in the landing mode. As a result, the center of gravity G also shifts to the leg side.

In the present embodiment, since a part of the main wing becomes a swept-back wing in the landing mode, a favorable landing performance can be achieved by lowering the center of gravity G while reducing the influence of the propeller wake.

Figure 8:
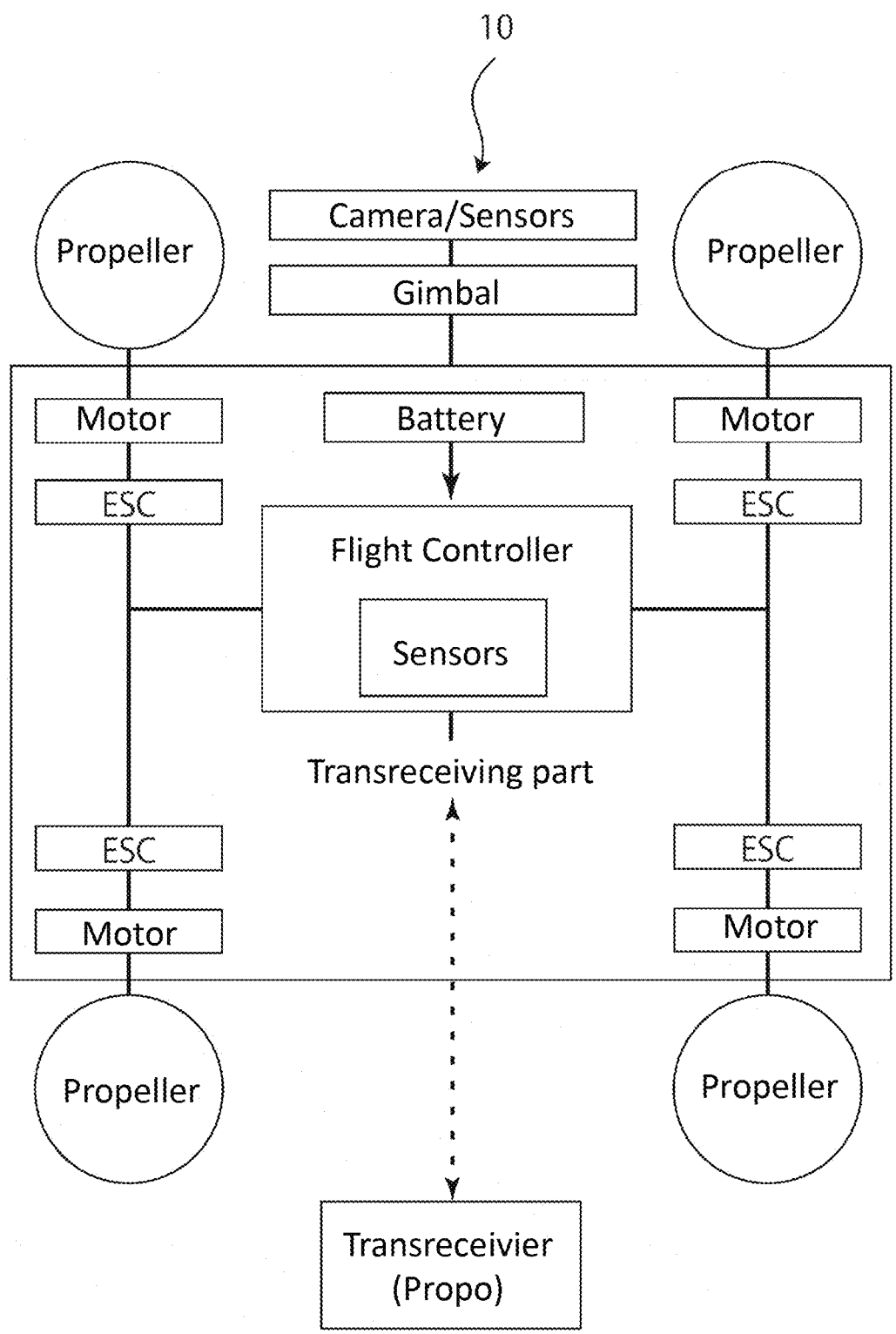
FIG. 8 is a diagram illustrating a functional block of a flight section of the aerial vehicle of FIG. 1.

The above-described rotary-flying aircraft has, for example, a functional block as shown in FIG. 8. Further, the functional block of FIG. 8 is a minimum reference structure. A flight controller is a so-called processing unit. The processing unit may have one or more processors, such as a programmable processor (e.g., a central processing unit (CPU)).

The processing unit has a memory that is not shown, and it is possible to access the memory. The memory stores logic, codes, and/or program instructions that can be executed by the processing unit in order to perform one or more steps.

The memory may include, for example, a separable medium such as an SD card or random access memory (RAM) or an external storage device. Data obtained from a camera and a sensor or the like may be transmitted directly to the memory and stored. For example, still image dynamic image data taken by a camera or the like is recorded in a built-in memory or an external memory.

The processing unit includes a control module configured to control the state of the rotary-flying aircraft. For example, the control module may control a propulsion mechanism (such as a motor) of the rotary-flying aircraft in order to adjust the spatial arrangement, velocity, and/or acceleration of the rotary-flying aircraft having six degrees of freedom (translational motions x, y, and z, and rotational motions θx, θy, and θz). The control module can control one or more of the states of a mounting part and sensors.

The processing unit can communicate with a transreceiving part configured to transmit and/or receive data from one or more external devices (e.g., a terminal, a display device, or other remote controller). The transreceiver can use any suitable communication means such as wired or wireless communication.

For example, the transreceiving part can use one or more of a local area network (LAN), a wide area network (WAN), infrared, wireless, WiFi, point-to-point (P2P) network, telecommunication network, cloud communication, and the like.

The transreceiving part can transmit and/or receive one or more of, data acquired by sensors, process results generated by the processing unit, predetermined control data, user command from a terminal or a remote controller, and the like.

Sensors according to the present embodiment may include inertial sensors (acceleration sensors, gyro sensors), GPS sensors, proximity sensors (e.g., LiDAR), or vision/image sensors (e.g., cameras).

The aerial vehicle of the present invention can be expected to be used as an aerial vehicle dedicated to courier services in medium to long distances, and as an industrial aerial vehicle in surveillance services in wide areas and reconnaissance and rescue services in mountainous areas. In addition, the aerial vehicle of the present invention can be used in airplane-related industries such as multicopters and drones. Furthermore, the present invention can be used as an aerial vehicle for investigation equipped with a camera or the like, and also can be used in various industries such as the security field, agriculture, infrastructure monitoring.

The embodiment described above is merely an example to facilitate the understanding of the present invention and are not intended to limit the present invention. It goes without saying that the present invention can be modified and improved without departing from the spirit and scope thereof, and the present invention includes its equivalents.

Figure 9:
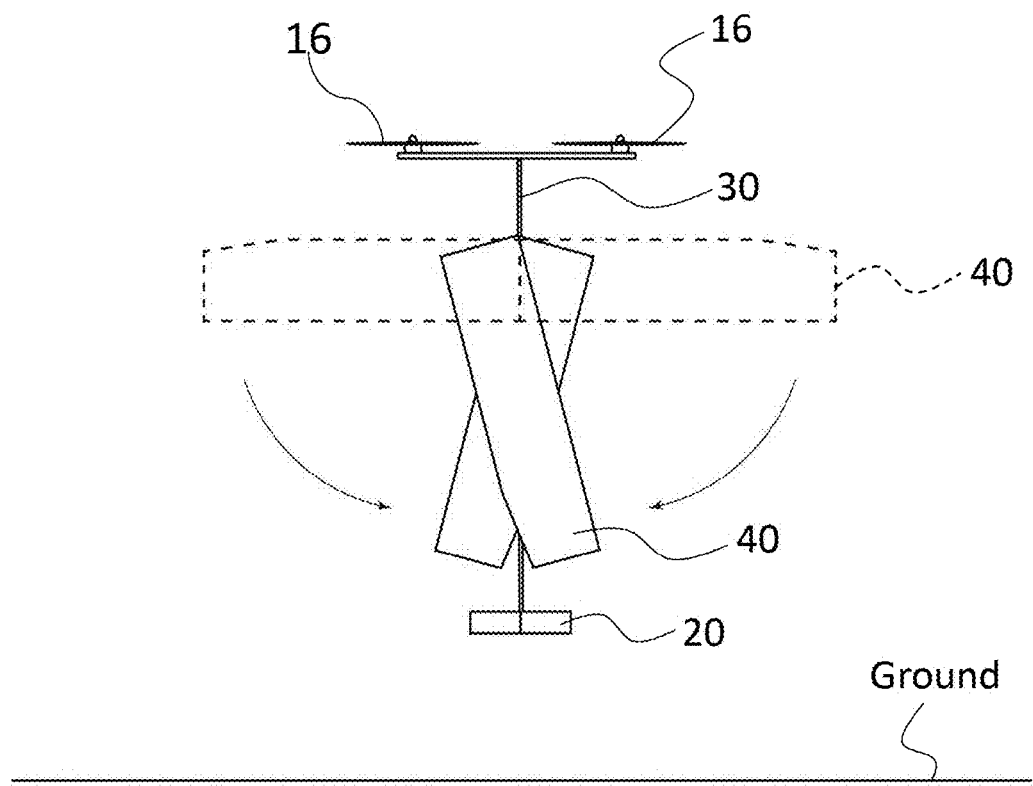
FIG. 9 is an explanatory diagram illustrating a modification of the aerial vehicle according to the present invention.
Figure 10:
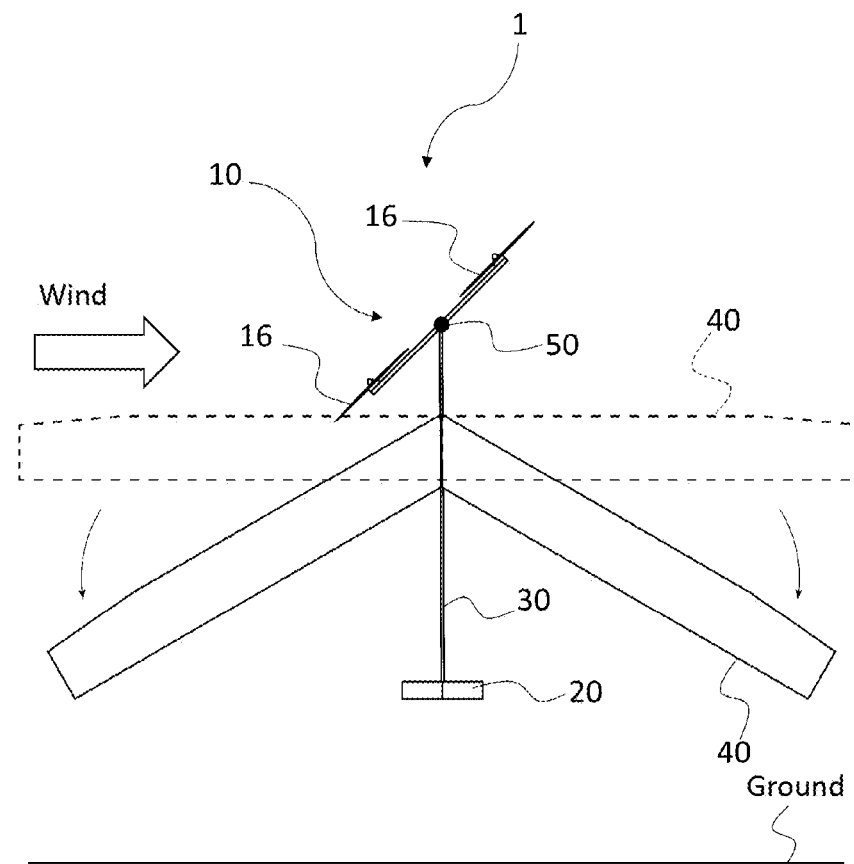
FIG. 10 is an explanatory diagram illustrating another modification of the aerial vehicle according to the present invention.

In the above-described embodiment, an example is shown in which the two fixed wings form a substantially inverted V shape on both sides of the fuselage 30 at the time of landing of the aerial vehicle 1. However, it is not limited thereto. For example, as shown in FIG. 9, the two fixed wings may be provided on the fuselage 30 so as to be foldable below the vehicle body. The use of folding wings has the advantage of being easy and inexpensive to store, transport and maintain on the ground.

Further, the thrust unit 10 and the fuselage 30 can be independently displaceable via the connecting part. For the connection part, a gimbal or the like that can swing around one axis, two axes, or three axes can be adopted.

DESCRIPTION OF REFERENCE NUMERALS

1: aerial vehicle
10: thrust unit
16: propeller (rotary vane)
20: tail
30: fuselage
40: upper fixed wing
42: lower fixed wing

The invention claimed is:
1. An aerial vehicle comprising:
a thrust unit;
a tail;
a fuselage that connects the thrust unit and the tail;
a main wing connected to the fuselage; and
a control unit for controlling at least the main wing,
wherein the main wing comprises a first wing and a second wing,
wherein, when in an initial state of the aerial vehicle, the fuselage is configured to stand in a vertical direction, and when the aerial vehicle ascends to a predetermined height, the aerial vehicle is configured to transition from an ascending posture to a horizontal posture, the fuselage being oriented in the vertical direction in the ascending posture and oriented in a horizontal direction in the horizontal posture,
wherein, when the aerial vehicle descends to make a landing, the aerial vehicle is oriented so that the thrust unit and the tail are an upper end and a lower end of the aerial vehicle, respectively, with respect to the ground, and the control unit is configured to control the first wing and the second wing to tilt toward the tail and to bring the first wing and the second wing closer together by rotating the first wing and the second wing about a longitudinal axis of the fuselage, so that the first wing and the second wing form an inverted V shape, and
wherein, when the aerial vehicle lands on the ground, the tail, an end of the first wing, and an end of the second wing are the lower end of the aerial vehicle contacting the ground.
2. The aerial vehicle of claim 1, wherein, when the aerial vehicle lands on the ground, the tail, the end of the first wing, and the end of the second wing contact the ground at three points defining a plane to tilt the fuselage backward.

3. The aerial vehicle of claim 2, further comprising a gimbal configured to connect the thrust unit and the fuselage to make the thrust unit and the fuselage move independently from each other,
  wherein the thrust unit includes:
  a plurality of propellers each including a plurality of rotary vanes;
  a plurality of motors rotating the plurality of propellers, respectively; and
  a plurality of motor arms each supporting a corresponding one of the plurality of propellers and a corresponding one of the plurality of motors.

\* \* \* \* \*